No. 12,727. REISSUED DEC. 3, 1907.

S. W. CRAMER.

HYGROMETER FOR REGULATING HUMIDIFYING AND HEATING SYSTEMS.

APPLICATION FILED SEPT. 3, 1907.

2 SHEETS—SHEET 1.

Witnesses
Chas. N. Durand.
W. Parker Reinohl.

Inventor
Stuart W. Cramer.
By D. C. Reinohl.
Attorney

No. 12,727. REISSUED DEC. 3, 1907.

S. W. CRAMER.

HYGROMETER FOR REGULATING HUMIDIFYING AND HEATING SYSTEMS.

APPLICATION FILED SEPT. 3, 1907.

2 SHEETS—SHEET 2.

Witnesses
Chas. N. Durand.
M. Bartels Reinohl.

Inventor
Stuart W. Cramer.
By D. C. Reinohl.
Attorney

UNITED STATES PATENT OFFICE.

STUART W. CRAMER, OF CHARLOTTE, NORTH CAROLINA.

HYGROMETER FOR REGULATING HUMIDIFYING AND HEATING SYSTEMS.

No. 12,727. Specification of Reissued Letters Patent. Reissued Dec. 3, 1907.

Original No. 811,383, dated January 30, 1906, Serial No. 238,626. Application for reissue filed September 3, 1907. Serial No. 391,256.

*To all whom it may concern:*

Be it known that I, STUART W. CRAMER, a citizen of the United States, residing at Charlotte, in the county of Mecklenburg and State of North Carolina, have invented certain new and useful Improvements in Hygrometers for Regulating Humidifying and Heating Systems; and I do hereby declare the following to be a full, clear, and exact description of the invention, such as will enable others skilled in the art to which it appertains to make and use the same.

My invention relates to instruments for regulating and indicating the degree of moisture in the atmosphere and the temperature of the atmosphere automatically in a factory or other building and in separate compartments thereof.

The invention consists in certain improvements in construction, which will be fully disclosed in the following specification and claims.

Figure 1:
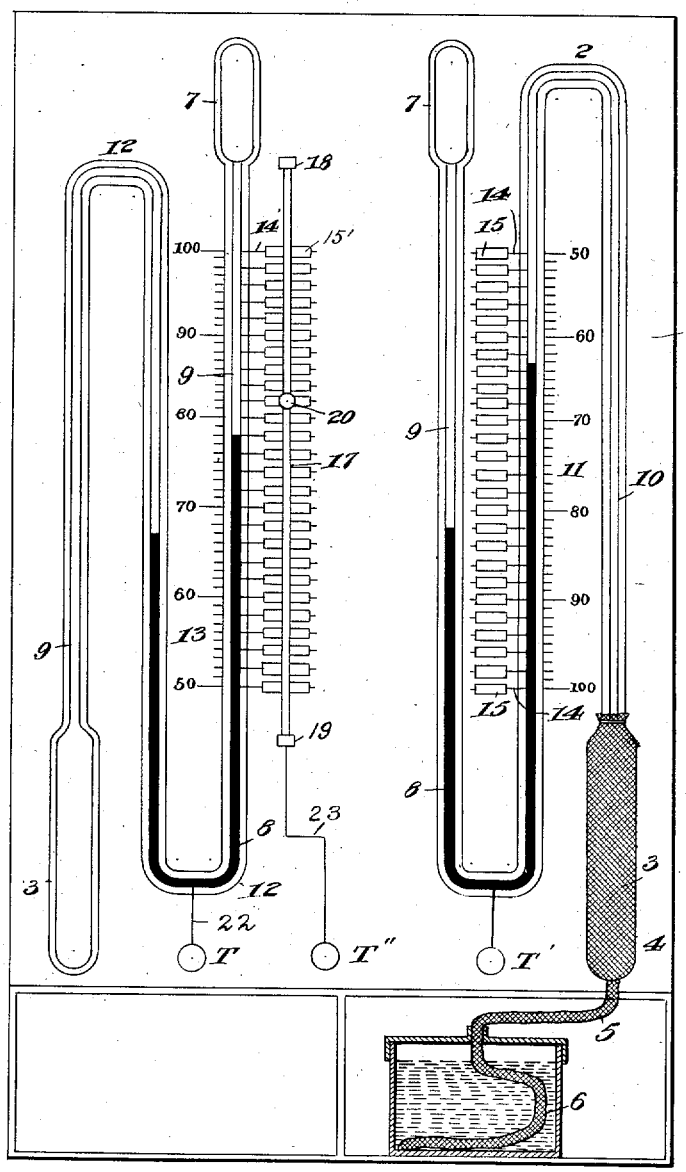
Figure 2:
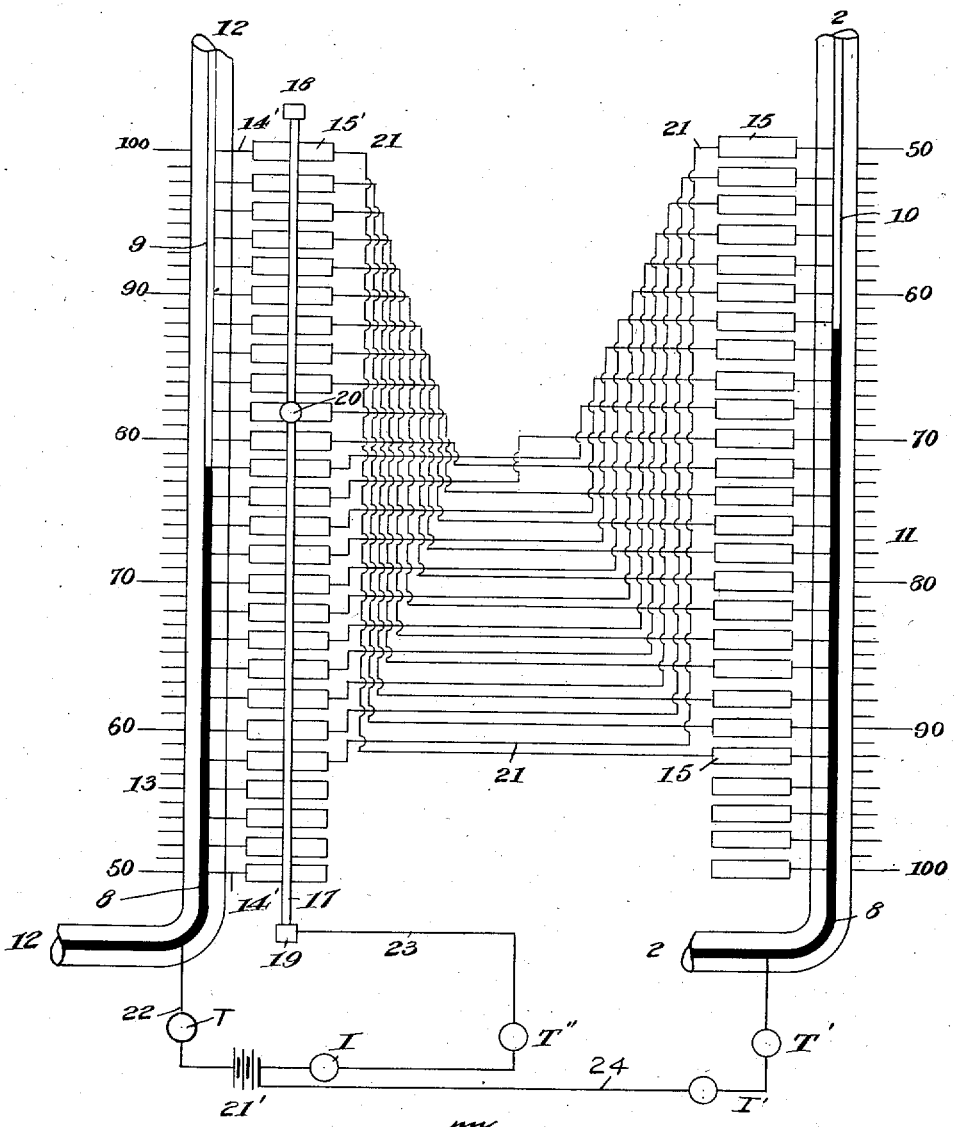

In the accompanying drawings, which form part of this specification:—Figure 1 represents a front elevation of an apparatus embodying my invention, and Fig 2 a diagrammatic illustration of the electrical conductors.

In practice it is found that within ranges of temperature ordinarily encountered in a textile factory a regular and uniform depression of the "wet-bulb" (as it is termed) corresponds with a practically-uniform relative humidity. In other words for a 70 degree temperature of air, as shown by a dry-bulb thermometer, a 6 degree depression of the wet-bulb would give approximately sixty-nine per cent. relative humidity, at 90 degrees temperature a 6 degree depression of the wet-bulb would give approximately seventy-three per cent. relative humidity, at 70 degrees temperature a 7 degree depression of the wet-bulb would give approximately sixty-five per cent. relative humidity, and at 90 degrees temperature a 7 degree depression of the wet-bulb would give approximately sixty-nine per cent. relative humidity. It is therefore obvious that we can arrive at a system of indicating within very close limits the relative humidity by a fixed depression of the wet-bulb. This can be further refined and made absolutely accurate by providing in the construction of the instrument for the necessary plus or minus variations in the depression of the wet-bulb.

Reference being had to the drawings and the designating characters thereon, the numeral 1 indicates the back or base on which the several parts of the instrument are supported. 2 is a wet-bulb thermometer having an elongated bulb 3, which is surrounded by a netting 4, of textile material, from which a wick 5 extends down into a vessel 6, containing water, and which water rises through the wick and netting by capillary attraction and cools the bulb according to the evaporative power of the atmosphere in the room. The tube used in this instance is a three-leg tube terminating at both ends in bulbs 3 at the lower end and 7 at the upper end, and the tube is provided with a column of mercury 8, which is interposed between columns 9 and 10 of a non-conducting liquid, such as alcohol, and this column of mercury consists of an outer leg on one side and an intermediate or indicating leg on the opposite side adjacent to the graduated scale 11. This scale, it will be noticed, has its highest ordinal or number at the bottom, and the intermediate column indicates increased temperature as it descends.

12 indicates a dry-bulb thermometer, and in construction the tube is an exact duplicate of the tube 2 of the wet-bulb thermometer, and the same reference characters are applied thereto. The distinction between the two thermometers lies in the scale 13, in which the highest ordinal or number is at the top of the dry-bulb thermometer, and the outer column indicates increased temperature as it ascends.

14 indicates wires which enter the tube of the wet-bulb thermometer, extend to the bore of the tube, and make contact with the mercury as the upper end of the intermediate leg approaches the respective wires.

15 represents metallic bars secured to the ends of the wires 14 and forming electrical conductors. 14′ represent like wires, and 15′ represents like metallic bars applied to the tube of the dry-bulb thermometer.

17 indicates a vertical metallic bar secured at its upper end in a non-conductor 18 and at its lower end in a like non-conductor 19, and on the bar is a sliding brush 20, which is placed in position over any one of the metallic bars 15′ and then clamped by a thumb-screw, and thus constitutes one pole of an electric thermostatic connection.

The wiring of the instrument is shown diagrammatically in Fig. 2. The wire 21, connected with the conducting-bar 15, extends from the upper connected bar on the wet-bulb thermometer 2 to the lower connected bar 15′ on the dry-bulb thermometer 12, and connections are made in like manner from the next higher bar connected to the wet-bulb thermometer to the next lower bar connected to the dry-bulb thermometer throughout all the bars.

21′ indicates a source of electrical energy and may be in the form of a battery, as conventionally indicated, or it may be a dynamo and with which the dry-bulb thermometer 12 is connected by wire 22 through a connecting-terminal or binding-post, (indicated by the letter T,) which connects with electro-magnets to operate a regulating-valve of a heating system. (Not shown.) The bar 17 is connected thereto by a wire terminal 23 through a connecting or binding-post, (indicated by the letter T″,) which connects with the same electro-magnets and regulating-valve, the electro-magnets being diagrammatically indicated by the letter I. The wet-bulb thermometer is connected to the battery-wire 24 through a terminal or binding-post, (indicated by T′,) which connects with electro-magnets, also diagrammatically indicated by I′, which operate regulating-valves on a humidifying system. (Not shown.)

The electrical energy supplied to the dry-bulb and the wet-bulb thermometers causes them to operate in harmony, and as the intermediate leg of mercury in the wet-bulb thermometer or the hygrometer side makes and breaks the electric circuit, due to a rise and fall in the humidity of the atmosphere, electric current is supplied to and cut off from the regulating-valves of the humidifying system to regulate the supply of water thereto, and as the outer leg of mercury in the dry-bulb thermometer or the thermostat side makes and breaks the circuit, due to variations in the temperature, the electric current is supplied to and cut off from the regulating-valve of a heating system to regulate the supply of steam or hot water thereto.

Having thus fully described my invention, what I claim is

1. The combination with a source of electrical energy, of means for indicating temperature and means for indicating humidity, and an electro-magnetic device each of said means being adapted to close an electric circuit through said electro-magnetic device, and electric conductors connecting said source of electrical energy, said indicating means and said electro-magnetic device.

2. The combination with a source of electrical energy, of means for indicating temperature and means for indicating humidity, and an electro-magnetic device, each of said means being adapted to close an electric circuit through said electro-magnetic device, and electric conductors connecting said source of electrical energy, said indicating means and said electro-magnetic device, means for controlling the supply of water to regulate the humidity, and electrical connections between said last named means and the means for indicating humidity.

3. The combination with a source of electrical energy, of means for indicating temperature and means for indicating humidity, and an electro-magnetic device, each of said means being adapted to close an electric circuit through said electro-magnetic device, and electric conductors connecting said source of electrical energy, said indicating means and said electro-magnetic device, means for controlling the supply of a heating medium to regulate the temperature, and electrical connections between said last named means and the means for indicating temperature.

4. The combination with a source of electrical energy, of means for indicating temperature and means for indicating humidity, and an electro-magnetic device, each of said means being adapted to close an electric circuit through said electro-magnetic device, and electric conductors connecting said source of electrical energy, said indicating means and said electro-magnetic device, means for controlling the supply of water to regulate the humidity, means for controlling the supply of a heating medium to regulate the temperature, and electrical connections between the last two named means, the means for indicating humidity and the means for indicating temperature.

5. The combination with a source of electrical energy, of means for indicating temperature and means for indicating humidity, each of the means being adapted to close an electric circuit, an electro-magnetic device, separate electrical conductors connecting said source of electrical energy with each of said means, one of said conductors including said electro-magnetic device, an electrical conductor connecting said means, and said latter conductor uniting a selected point on the means for indicating temperature with a selected point on the means for indicating humidity.

6. The combination with a source of electrical energy, of means for indicating temperature and means for indicating humidity, each of the means being adapted to close an electric circuit, an electro-magnetic device, separate electrical conductors connecting said source of electrical energy with each of said means, one of said conductors including said electro-magnetic device, a plurality of electrical conductors connecting said means, each of said latter conductors uniting selected points on the indicating means.

7. The combination with a source of electrical energy, of a dry bulb thermometer and a wet bulb thermometer, each of said thermometers being adapted to close an electric circuit, an electro-magnetic device, separate electrical conductors connecting said source of electrical energy with each of said thermometers, one of the said conductors including said electro-magnetic device, an electrical conductor connecting said thermometers, and said latter conductor uniting a selected point on the dry-bulb thermometer with a selected point on the wet-bulb thermometer.

8. The combination with a source of electrical energy, of a dry-bulb thermometer and a wet-bulb thermometer, each of said thermometers being adapted to close an electric circuit, an electro-magnetic device, separate electrical conductors connecting said source of electrical energy with each of said thermometers, one of the said conductors including said electro-magnetic device, a plurality of electrical conductors connecting said thermometers, each of said latter conductors uniting a selected point on the dry-bulb thermometer with a selected point on the wet-bulb thermometer.

9. The combination with a source of electrical energy, of means for regulating and indicating temperature and means for regulating and indicating humidity, each of said means being adapted to close an electric circuit, electro-magnetic devices, separate electrical conductors connecting said source of electrical energy with each of said means, each of said conductors including one of said electro-magnetic devices, an electrical conductor connecting said means, said latter conductor uniting a selected point on the means for indicating temperature with a selected point on the means for indicating humidity, and an electrical conductor leading from said source of electrical energy and adapted to be placed in communication with any one of said latter conductors.

10. The combination with a source of electrical energy, of means for regulating and indicating temperature and means for regulating and indicating humidity, each of said means being adapted to close an electric circuit, electro-magnetic devices, separate electrical conductors connecting said source of electrical energy with each of said means, each of said conductors including one of said electro-magnetic devices, a plurality of electrical conductors connecting said means, each of said latter conductors uniting selected points on the means for indicating temperature and humidity, and an electrical conductor leading from said source of electrical energy and adapted to be placed in communication with any one of said latter conductors.

11. The combination with a source of electrical energy, of a dry-bulb thermometer and a wet-bulb thermometer, each of said thermometers being adapted to close an electric circuit, electro-magnetic devices, separate electrical conductors connecting said source of electrical energy with each of said thermometers, each of said conductors including one of said electro-magnetic devices, an electrical conductor connecting said thermometers, said latter conductor uniting a selected point on the dry-bulb thermometer with a selected point on the wet-bulb thermometer, and an electrical conductor leading from said source of electrical energy and adapted to be placed in communication with any one of said latter conductors.

12. The combination with a source of electrical energy, of a dry-bulb thermometer and a wet-bulb thermometer, each of said thermometers being adapted to close an electric circuit, electro-magnetic devices, separate electrical conductors connecting said source of electrical energy with each of said thermometers, each of said conductors including one of said electro-magnetic devices, a plurality of electrical conductors connecting said thermometers, each of said latter conductors uniting selected points on the dry-bulb thermometer with selected points on the wet-bulb thermometer, and an electrical conductor leading from said source of electrical energy and adapted to be placed in communication with any one of said latter conductors.

13. The combination with a source of electrical energy, of means for indicating temperature and means for indicating humidity, each of said means being adapted to close an electric circuit, electro-magnetic devices, separate electrical conductors connecting said source of electrical energy with each of said means, each of said conductors including one of said electro-magnetic devices, electrical conductors connecting said thermometers, each of said latter conductors uniting a selected point on the means for indicating temperature with a selected point on the means for indicating humidity, the said means being constructed and arranged so that the circuit closing ends of the mercurial columns move in opposite directions under the influence of a change in temperature, and an electrical conductor leading from said source of electrical energy and adapted to be placed in communication with any one of said latter conductors.

14. The combination with a source of electrical energy, of a dry-bulb thermometer and a wet-bulb thermometer, each of said thermometers being adapted to close an electric circuit, electro-magnetic devices, separate electrical conductors connecting said source of electrical energy with each of said thermometers, each of said conductors including one of said electro-magnetic devices, a plurality of electrical conductors connecting said thermometers, each of said latter conductors uniting a selected point on the dry-bulb thermometer with a selected point on the wet-bulb thermometer, the thermometers being constructed and arranged so that the circuit-closing ends of the mercurial columns move in opposite directions under the influence of a change in temperature, and an electrical conductor leading from said source of electrical energy and adapted to be placed in communication with any one of said latter conductors.

In testimony whereof I affix my signature, in presence of two witnesses.

STUART W. CRAMER.

Witnesses:

JNO. C. WATSON,

R. I. DALTON.